W. J. WESTWOOD.
Adjustable Sleigh-Shoe for Wheeled Vehicles.
No. 207,923. Patented Sept. 10, 1878.
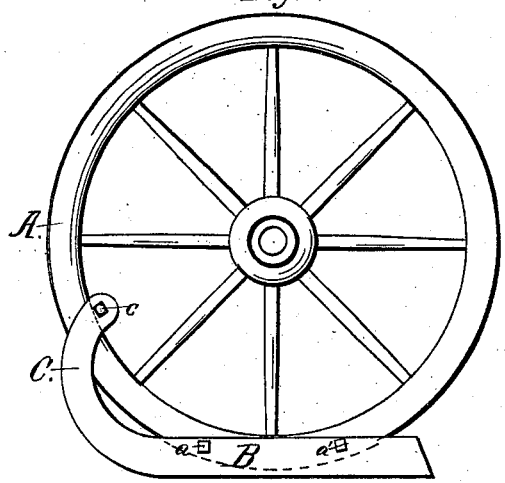
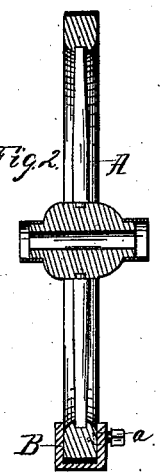
WITNESSES
L. H. Seely
R. N. Dyer
INVENTOR
William J. Westwood
by Geo. W. Dyer & Co.
ATTORNEYS.

UNITED STATES PATENT OFFICE.

WILLIAM J. WESTWOOD, OF SOUTH BEND, INDIANA.

IMPROVEMENT IN ADJUSTABLE SLEIGH-SHOES FOR WHEELED VEHICLES.

Specification forming part of Letters Patent No. 207,923, dated September 10, 1878; application filed February 11, 1878.

*To all whom it may concern:*

Be it known that I, WILLIAM J. WESTWOOD, of South Bend, in the county of St. Joseph and State of Indiana, have invented a new and useful Improvement in Adjustable Sleigh-Shoes for Wheeled Vehicles; and I do hereby declare that the following is a full and exact description of the same, reference being had to the accompanying drawings, and to the letters of reference marked thereon.

The object I have in view in this invention is to provide an adjustable sleigh-shoe for wheeled vehicles which will be simpler in construction than those before used, less liable to get out of order, and requiring less complicated attachments in order to apply it to wheels. It frequently happens that travelers in wagons or other wheeled vehicles are surprised by snow-storms, which render the progress of such vehicles difficult, if not impossible; and it is my purpose to make my runners portable, so that they may be carried in a wagon, and applied to the wheels without difficulty or loss of time under such circumstances.

My invention therein consists, first, in securing the body of the runner to the wheel by means of peculiar set-screws; and, further, in the construction and arrangement of the several parts composing my adjustable sleigh-shoe, as fully hereinafter explained.

In order that others skilled in the art may understand the construction and use of my invention, I now describe the same, having reference to the drawings, in which—

Figure 1 is a side elevation of a wheel with my runner attached; Fig. 2, a cross-section of the runner with the wheel in place; Fig. 3, a separate view of the turned-up portion of the runner, showing the manner of attaching it to the wheels; and Fig. 4, a separate view of one of the set-screws.

Like letters denote corresponding parts.

A represents the wheel of a wagon or other vehicle of ordinary construction. B is an adjustable sleigh-shoe, which is preferably rolled or cast, of iron or steel, in the form shown in cross-section in Fig. 2. $a$ $a^1$ are set-screws, one of which is shown in Fig. 4 having a head, $a^3$, squared in the ordinary manner to receive a wrench for attaching the shoe to the wheel, a body screw-threaded as shown, and a point, $b$, which enters the wood of the wheel a short distance.

The end C of the runner which is turned up is bifurcated, as shown particularly in Fig. 3, and the rim of the wheel passes between the two arms thus formed, a bolt, $c$, being passed through both arms, thus securely locking the end of the runner in place. Holes are bored in the side of the runner, through which the set-screws are passed and screwed up tightly, the point and part of the screw-threaded body entering the wood of the wheel, and a firm fastening is thus secured.

In use, the runner being securely attached to the wheel at the end C, very light fastenings only are required to retain the rim of the wheel in the channel of the shoe, it being held in that position by the weight of the vehicle, and thus the set-screws afford an ample fastening to keep the runner in place.

The runner may be adjusted to any part of the wheel desired, and is very easy of application, requiring no complicated attachments. These runners may be carried easily in a wagon, and applied when necessary, and removed with very little time and trouble.

It is understood that one runner may be applied to two wheels on a side in the same manner as described, in which case two or more set-screws would be necessary for each wheel.

It is also understood that I do not limit myself to iron or metal in the construction of my device, because wood may be used alone or together with iron; it being only necessary to construct the runner of the channel shape shown, so that the set-screws may be used to the best advantage.

The advantages of my device are numerous. The devices hitherto used for the purpose have not been adapted to be removed and applied at a moment's notice, but have been designed more for permanent use throughout the winter, and on this account are much more complex, and consequently more expensive, than my device, which can be constructed at very little cost, and is not liable to get out of repair at any part that cannot be replaced at trifling expense.

Having thus fully described my invention and set forth some of its advantages, I claim as new therein and desire to secure by Letters Patent—

1. The combination, with the runner B, of the set-screws $a\ a^1$, constructed and arranged substantially as and for the purposes set forth.

2. The adjustable sleigh-shoe described, consisting of runner B, set-screws $a\ a^1$, bifurcated end C, and bolt $b$, all constructed and arranged substantially as and for the purposes set forth.

This specification signed and witnessed this 21st day of January, 1878.

WILLIAM J. WESTWOOD.

Witnesses:
S. W. PALMER,
W. L. FARR.